Patented Aug. 23, 1960

2,950,327

PREPARATION OF PENTAERYTHRITOL

Raymond Carpentier, Ixelles, and Pol Lambert, Uccle, Belgium, assignors to Union Chimique Belge, S.A., Brussels, Belgium, a corporation of Belgium No Drawing. Filed Mar. 28, 1958, Ser. No. 724,500

Claims priority, application Belgium Feb. 24, 1958

6 Claims. (Cl. 260—635)

Pentaerythritol is usually prepared by reacting acetaldehyde and formaldehyde in an aqueous medium in the presence of an alkaline reacting condensation agent such as sodium or calcium hydroxides. The methods of preparation following this reaction give a yield of 60-70% of crystalline pentaerythritol. The pentaerythritol so obtained contains 10 to 15% polypentaerythritols; it may be used for many applications without further purification.

It is also known that the presence of methanol in the reaction medium reduces the formation of pentaerythritol. Moreover, during the crystallization the formation of molasses and sirupy products is observed with hindrance or slackening in the production of crystals. The same effect is caused by the presence of free formaldehyde.

The addition of catalysts such as derivatives of the metals of the first long period of the periodic system, boric acid, aluminum, zinc and tin compounds, increases the yield of pentaerythritol. The reaction is shortened and may be completed in 4 hours and even less. The final temperature necessary to remove the residual formaldehyde varies from 40 to 80° C.

One of the objects of this invention is to provide a new method for preparing pentaerythritol which comprises reacting acetaldehyde and formaldehyde in an aqueous medium in the presence of an alkaline reacting condensation agent and of a catalyst containing at least one organic compound forming free radicals.

Another object of this invention is to carry out the reaction at a temperature which does not exceed 35-40° C. and to complete the reaction in less than 3 hours.

Another object of this invention is to facilitate the extraction of the pentaerythritol from the reaction solution and its crystallization, as the formation of molasses and sirupy products is lower.

A still further object of this invention is to obtain pentaerythritol in a yield of 80-90%.

The condensation agent is selected from the group consisting of alkaline and earth-alkaline bases such as sodium, potassium, calcium and barium hydroxides and mixtures thereof.

The compounds forming free radicals are, for instance organic peroxides and hydroperoxides, azo-bis-nitriles, alpha-diketones and mixtures thereof. The following compounds are advantageously used: acetyl peroxide, benzoyl peroxide, acetyl-benzoyl peroxide, t-butyl hydroperoxide, cumene hydroperoxide, Tetralin (tetrahydronaphthalene) hydroperoxide, 2,2'-azo-bis-isobutyronitrile, 2,2'-azo-bis-2,4-dimethylisovaleronitrile, 1,1-azo-bis-1-cyclohexanenitrile, 2,3-butanedione, etc.

For one mole of acetaldehyde one takes at least 4 moles and preferably 4.5 to 5.5 moles of formaldehyde.

For one mole of acetaldehyde one takes 1–3 and preferably 1.35–1.50 equivalent-moles of an alkaline reacting condensation agent. The amount of the catalyst varies from 0.05 to 5% of the total weight of the aldehydes. The best proportion has been found 0.25 to 2% of the same weight. The efficiency of the catalyst is improved when it is introduced in portions.

According to the invention, acetaldehyde and formaldehyde react together in the presence of the catalyst and the alkaline reacting condensation agent in an aqueous medium where a vigorous stirring homogenizes perfectly the ingredients.

One uses liquid acetaldehyde cooled to about 0° C. or its aqueous solution. It is possible to use compounds such as acetaldol which reacts as acetaldehyde in the operating conditions.

Formaldehyde may be an aqueous solution containing less than 1% of methanol or a compound releasing formaldehyde in the operating conditions i.e. paraformaldehyde.

The ingredients may be introduced in the reaction medium in any order. One may first mix the aldehydes and add therein the alkaline reacting condensation agent and the catalyst. It is also possible to mix the aldehydes and the catalyst and to add therein a solution or a suspension of the condensation agent. We have found that it is generally better to add gradually the acetaldehyde to an aqueous mixture containing the formaldehyde, the catalyst and the alkaline reacting condensation agent.

During the reaction, the temperature of the reaction medium is maintained between 15 and 40° C. When one introduces gradually the acetaldehyde in an aqueous formaldehyde solution containing the catalyst and the alkaline reacting condensation agent, the temperature is first maintained between 15 and 20° C. and rises afterwards during the reaction which is completed at a temperature not exceeding 40° C. The exothermicity of the reaction is sufficient to attain a temperature of 35-40° C.

The reaction is completed when at least one of the following facts is observed:

(1) spontaneous rise of the temperature of the reaction medium,
(2) yellow or brownish coloration of the solution,
(3) disappearance of free aldehydes.

Following the process of the invention an aqueous solution of pentaerythritol is obtained. The extraction of pure pentaerythritol is carried out by known methods. These consist essentially in the following steps: neutralization of the reaction medium using one or more acids; filtration or centrifugation of the eventual solids; concentration of the solution; crystallization of pentaerythritol in one or more cycles, separation of pure pentaerythritol.

The following examples are given by way of illustration and not by way of limitation. All the parts are by weight.

*Example 1*

To a mixture of 158 parts of 95% paraformaldehyde, 52 parts of calcium hydroxide, 1 part of 2,2'-azo-bis-isobutyronitrile and 1000 parts of water are added in one hour with vigorous stirring, 44 parts of liquid acetaldehyde. The medium temperature rises gradually from 15 to 35° C.

When the acetaldehyde is wholly introduced, 1 part of 2,2'-azo-bis-isobutyronitrile is further added while maintaining the temperature at 35° C. Stirring is continued for 2 hours until a clear yellow coloration appears and until the odor of formaldehyde has disappeared. The pentaerythritol is extracted from the solution by usual methods.

122 parts of crystalline pentaerythritol, corresponding to 90% of the theoretical weight, are obtained. This product contains about 12% of polypentaerythritols.

*Example 2*

A mixture is prepared containing 1000 parts of water, 158 parts of 95% paraformaldehyde, 52 parts of calcium hydroxide and 1 part of cumene hydroperoxide in a cumene solution.

With vigorous stirring and maintaining the temperature between 18 and 20° C., 44 parts of liquid acetaldehyde are added over a period of 45 minutes.

After the introduction of the acetaldehyde, stirring is continued during 30 minutes and afterwards the mixture is heated to 40° C. over a period of 60 minutes. After 25 minutes heating at the same temperature, the mass takes a yellow color and a rise of temperature is observed.

The pentaerythritol is extracted by usual methods.

118 parts of crystalline pentaerythritol, corresponding to about 87% of the theoretical weight, are obtained.

Example 3

A mixture is prepared containing 500 parts of a 30% formaldehyde solution with less than 1% methanol, 52 parts of calcium hydroxide, 650 parts of water and 0.5 part of 1,1'-azo-bis-1-cyclohexanenitrile.

In 1 hour, between 18 and 20° C., 44 parts of liquid acetaldehyde are added.

The temperature rises gradually to 35° C. and 0.5 part of 1,1'-azo-bis-1-cyclohexanenitrile is added. The reaction medium is then heated to 38–40° C. and this temperature is maintained over a period of 45 minutes.

The pentaerythritol is extracted from the solution by usual methods.

116.6 parts of crystalline pentaerythritol, corresponding to 85.7% of the theoretical weight, are obtained.

Example 4

To a mixture of 650 parts of water, 500 parts of a 30% formaldehyde aqueous solution containing less than 1% methanol, 56 parts of sodium hydroxide and 0.5 part of 2,2'-azo-bis-isobutyronitrile, are added 44 parts of liquid acetaldehyde. The reaction is carried out according to the process of Example 1.

After the introduction of acetaldehyde, the reaction medium is further heated at 40° C. over a period of two hours.

The pentaerythritol is extracted from the solution by usual methods.

112.1 parts of crystalline pentaerythritol, corresponding to 82.4% of the theoretical weight, are obtained.

Example 5

A mixture is prepared which contains 500 parts of a 30% formaldehyde aqueous solution containing less than 1% methanol, 52 parts of calcium hydroxide, 585 parts of water and 0.5 part of 2,2'-azo-bis-isobutyronitrile.

110 parts of a 40% aqueous acetaldehyde solution are thereafter added at a temperature between 18 and 20° C. and over a period of one hour.

Temperature rises gradually to 35° C. and 0.5 part of 2,2'-azo-bis-isobutyronitrile is then added. Heating is carried out at 38–40° C. and this temperature is maintained during 45 minutes.

The pentaerythritol is extracted from the solution by usual methods.

115 parts of crystalline pentaerythritol, corresponding to about 84% of the theoretical weight, are obtained.

Example 6

To a mixture of 158 parts of a 95% paraformaldehyde, 52 parts of calcium hydroxide and 1 part of 2,3-butanedione in 1000 parts of water, are added over a period of 45 minutes and with vigorous stirring 44 parts of liquid acetaldehyde. The temperature rises gradually from 15 to 35° C.

When acetaldehyde is wholly introduced, 1 part of 2,3-butanedione is further added while maintaining the temperature at 35° C. Stirring is maintained at the same temperature until the odor of formaldehyde has disappeared. The reaction time is 145 minutes.

The pentaerythritol is extracted from the solution by usual methods.

109 parts of crystalline pentaerythritol, corresponding to about 80% of the theoretical weight, are obtained.

Example 7

To a mixture of 158 parts of a 95% paraformaldehyde, 52 parts of calcium hydroxide, 0.25 part of benzoyl peroxide and 0.25 part of 2,2'-azo-bis-isobutyronitrile in 1000 parts of water, are added over a period of 40 minutes and with vigorous stirring, 44 parts of liquid acetaldehyde.

When acetaldehyde is wholly introduced, 0.25 part of benzoyl peroxide and 0.25 part of 2,2'-azo-bis-isobutyronitrile are further added maintaining the temperature at 35° C. The reaction is completed when the solution takes a yellow coloration.

The pentaerythritol, corresponding to 82.3% of the theoretical weight, are obtained.

We claim:
1. A process for the preparation of pentaerythritol which comprises reacting one mole of acetaldehyde with 4 to 5.5 moles of formaldehyde in the presence of (a) 1 to 3 equivalent-moles of an alkaline reacting condensation agent selected from the group consisting of alkali metal and alkaline earth metal hydroxides, and (b) from 0.05 to 5% based on the total weight of said aldehydes of a catalyst containing at least one organic compound forming free radicals and selected from the group consisting of acetyl, benzoyl and acetyl benzoyl peroxides; t-butyl, cumene and tetrahydronaphthalene hydroperoxides; 2,2'-azo-bis-isobutyronitrile, 2,2'-azo-bis-2,4-dimethylisovaleronitrile, 1,1-azo-bis-1-cyclohexanenitrile and 2,3-butanedione, said reacting being carried out in an aqueous medium and at a temperature between 15 and 40° C.

2. A process as claimed in claim 1, wherein the catalyst is 2,2'-azo-bis-isobutylronitrile.

3. A process as claimed in claim 1, wherein the catalyst is cumene hydroperoxide.

4. A process as claimed in claim 1, wherein the catalyst is 1,1'-azo-bis-1-cyclohexanenitrile.

5. A process as claimed in claim 1, wherein the catalyst is 2,3-butanedione.

6. A process as claimed in claim 1, wherein the catalyst is a mixture of benozyl peroxide and 2,2'-azo-bis-isobutyronitrile.

References Cited in the file of this patent

UNITED STATES PATENTS

| | | |
|---|---|---|
| 2,486,774 | Wyler | Nov. 1, 1949 |
| 2,562,102 | Jackson et al. | July 24, 1951 |
| 2,790,836 | Mitchell et al. | Apr. 30, 1957 |

FOREIGN PATENTS

| | | |
|---|---|---|
| 742,159 | Great Britain | Dec. 21, 1955 |